United States Patent Office 3,310,411
Patented Mar. 21, 1967

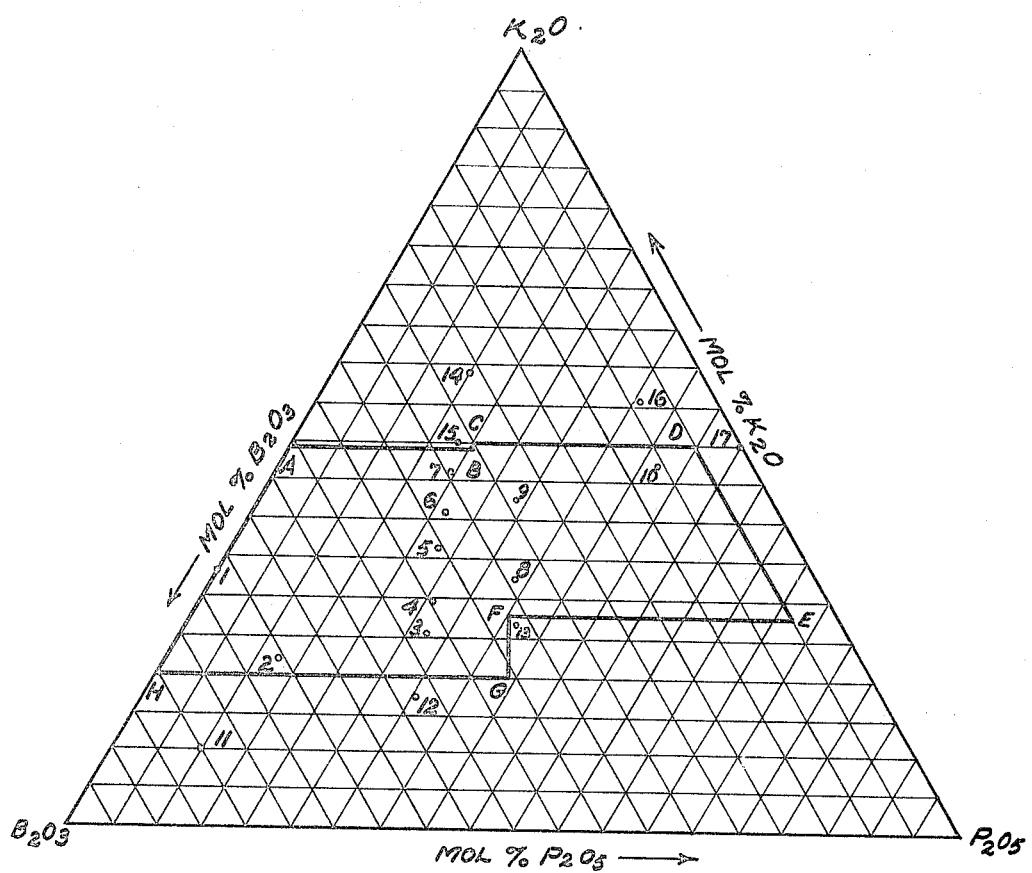
Inventors:
Willem Vedder,
Richard J. Ketterer,
by Paul R. Webb, II
Their Attorney.

3,310,411
INORGANIC-BONDED RECONSTITUTED MICA SHEET
Willem Vedder, Albany, and Richard J. Ketterer, Burnt Hills, N.Y., assignors to General Electric Company, a corporation of New York
Filed Jan. 30, 1963, Ser. No. 254,908
9 Claims. (Cl. 106—39)

This invention relates to reconstituted mica sheet with an inorganic binder and to methods of preparing such sheet and more particularly to reconstituted mica sheet with an inorganic binder, which is characterized by improved flexural strength and substantial moisture resistance, and to methods of preparing such sheet.

The preparation of reconstituted mica sheet is known in the art and is described, for example, in United States Letters Patent 2,549,880—Bardet; 2,614,055—Senarclens; and 2,709,158—Bouchet. Reconstituted mica sheet, which is a desirable high temperature electrical insulator, is employed in a variety of applications, such as electrical insulation, as a dielectric material in capacitors, and as spacing members in electron tubes.

The term "reconstituted mica sheet with an inorganic binder" as used in this application is used in its usual sense to refer to a layer-like aggregate of comminuted mica particles and to laminae of these layer-like aggregates, impregnated with an inorganic binder. Such reconstituted mica sheet is prepared by grinding up mica flakes, dispersing the resulting particles in an aqueous solution, forming a wet reconstituted mica sheet, drying and calendering in conventional equipment by conventional paper-making techniques, impregnating the sheet with an inorganic binder, drying the impregnated sheet, remoistening, pressing and baking to produce the inorganic-bonded reconstituted mica sheet. Naturally occurring layer silicates such as muscovite, phlogopite, lepidolite or vermiculite, or synthetic layer silicates is employed suitably in the method.

Present inorganic-bonded reconstituted mica sheet does not possess as high a flexural strength as desired. For example, such mica sheet exhibits flexural strength on the order of 30,000 pounds per square inch which is approximately 50 percent of the flexural strength of flake mica. Thus, it would be desirable to provide an inorganic-bonded reconstituted mica sheet with improved flexural strength. Secondly, such an improved inorganic-bonded mica sheet must exhibit complete or substantial moisture resistance. It would also be advantageous to provide methods of preparing such improved reconstituted mica sheet.

It is an object of our invention to provide an improved inorganic-bonded reconstituted mica sheet.

It is another object of our invention to provide an inorganic-bonded reconstituted mica sheet with improved flexural strength and substantial moisture resistance.

It is a further object of our invention to provide a method of preparing an inorganic-bonded reconstituted mica sheet with improved flexural strength and substantial moisture resistance.

In carrying out our invention in one form, a method of preparing inorganic-bonded reconstituted mica sheet of improved flexural strength and substantial moisture resistance comprises providing reconstituted mica sheet of comminuted particles, impregnating the sheet with a binder of oxides in amount, consisting of relative mol percentages of $B_2O_3$, $K_2O$, and $P_2O_5$ lying within the area defined approximately in the accompanying ternary diagram of the single figure of the drawing by the solid lines AB, BC, CD, DE, EF, FG, GH and HA, drying the impregnated sheet, remoistening the sheet, pressing the sheet, and baking the sheet at a temperature of about 560° C.

These and other objects, features and advantages of the invention will be better understood from the following description taken in connection with the accompanying drawing in which:

The single figure of the drawing is a ternary diagram of a $B_2O_3$, $K_2O$ and $P_2O_5$ system illustrating the composition of the inorganic binder of the invention.

The reconstituted mica sheet of the present invention is prepared by grinding up naturally occurring or synthetic mica flakes into extremely fine particles. The grinding of the mica flakes is accomplished by any suitable method. In general, the grinding is accomplished by first heating the mica flakes at a temperature in the temperature range of 750° C. to 850° C., preferably 800° C. for a period of time from about 5 minutes to 20 minutes, preferably about 10 minutes. The heating step softens and delaminates the mica and increases its bulk volume. This heat treated mica is then added to an aqueous medium and agitated by any suitable means, such as a high speed comminuter or mixer to convert the mica into small particles or platelets. A pulp-like suspension of mica results from this agitation. The extra-fine and extra-coarse particles may then be removed from the suspension. The resulting slurry is formed into a wet reconstituted mica sheet on conventional paper making apparatus wherein the mica particles are allowed to settle on a screen and the aqueous medium is removed from the particles by suction or evaporation. The sheet is then dried and calendered in conventional equipment. An inorganic binder in solution is added to the dried sheet. It is also possible to apply the solution to the pulp-like suspension of mica or to the wet sheet. The impregnated sheet is then dried, remoistened, pressed and baked at a temperature of about 560° C. to produce an improved inorganic-bonded reconstituted mica sheet.

The present invention is directed to an inorganic-bonded reconstituted mica sheet which exhibits improved flexural strength and substantial moisture resistance and to methods of preparing such sheet. We found that reconstituted mica sheet with an inorganic binder having potassium ions increased the flexural strength of the sheet above 40,000 pounds per square inch and provided substantial moisture resistance. However, the binder impregnated in the reconstituted mica sheet must have a composition, defined in terms of its oxides in amount, consisting of relative mol percentages of $B_2O_3$, $K_2O$ and $P_2O_5$ lying within the area defined approximately in the accompanying ternary diagram of the single figure of the drawing by the solid lines AB, BC, CD, DE, EF, FG, GH and HA or consisting of relative mol percentages of $B_2O_3$ and $K_2O$ defined in the accompanying ternary diagram of the single figure of the drawing by the solid line HA, to produce the improved flexural strength and substantial moisture resistance. The dried or wet reconstituted mica sheet is impregnated with the binder or the binder is added to the mica slurry to provide these improved properties. We found further that reconstituted mica sheets which were impregnated with various binders having potassium ions which compositions were not within the above defined area or on the line HA produced a flexural strength less than 40,000 pounds per square inch, a flexural strength less than 40,000 pounds per square inch with poor moisture resistance, or improved flexural strength with poor moisture resistance. Suitable raw materials which we found for employment in the binder composition preparation include potassium borates, potassium phosphates, and acid salts thereof, boric acid, phosphoric acid, potassium hydroxide, and oxides of boron, phosphorous, and potassium.

Reference is made to the single figure of the drawing which is a ternary diagram of a $B_2O_3$, $K_2O$ and $P_2O_5$ system illustrating the preferred composition of the cured binder impregnated into the reconstituted mica sheet as described above. This binder comprises preferably 2 to 12 weight percent of the inorganic-bonded reconstituted mica sheet. The solid lines AB, BC, CD, DE, EF, FG, GH and HA define the area of relative mol percentages $B_2O_3$, $K_2O$ and $P_2O_5$ constituting the inorganic binder compositions which are impregnated into reconstituted mica sheet to produce improved flexural strength greater than 40,000 pounds per square inch and substantial moisture resistance. The term moisture resistance, means the percentage recovery of flexural strength after a two-hour water immersion and subsequent redrying of the inorganic-bonded reconstituted mica sheet. Substantial moisture resistance is defined as at least 88.0 percent recovery of flexural strength under the above conditions. Compositions 1–10 as shown on the diagram in the single figure of the drawing are within the abovedefined area. Compositions 11–14 and 15–17 are outside the above composition area. Compositions 18 and 19, which comprise mol percentages of $B_2O_3$, $P_2O_5$ and $Na_2O$ or $Li_2O$, disclose flexural strengths below 40,000 pounds per square inch.

Table I discloses the raw materials in parts by weight of the dry salts and the distilled water to provide the binder compositions 1–19 for impregnation of the reconstituted mica sheet.

| No. 1 | $K_2B_4O_7$ $\cdot 4H_2O$ | $KH_2PO_4$ | $H_3BO_3$ | 85% $H_3PO_4$ | KOH | $H_2O$ |
|---|---|---|---|---|---|---|
| 1 | 100.00 | | | | | 1,900 |
| 2 | 54.44 | | 22.08 | 23.48 | | 1,928 |
| 3 | 25.06 | 25.52 | 23.90 | 25.52 | | 2,451 |
| 4 | 15.40 | 24.49 | 29.13 | 30.98 | | 1,671 |
| 5 | 19.62 | 31.18 | 23.84 | 25.36 | | 1,591 |
| 6 | 49.49 | 50.51 | | | | 2,464 |
| 7 | 26.99 | 42.91 | 14.59 | 15.51 | | 1,451 |
| 8 | 25.38 | 45.20 | 10.27 | 19.15 | | 2,017 |
| 9 | 35.96 | 64.04 | | | | 2,000 |
| 10 | 12.29 | 87.71 | | | | 2,464 |
| 11 | 35.49 | | 65.51 | | | 2,000 |
| 12 | 22.25 | 22.70 | 26.67 | 28.38 | | 2,170 |
| 13 | 28.30 | 53.05 | | | 18.65 | 2,000 |
| 14 | 38.60 | 61.40 | | | | 1,231 |
| 15 | 30.24 | 48.08 | 10.50 | 11.18 | | 1,390 |
| 16 | 9.29 | 76.84 | | | | 1,799 |
| 17 | | 100.00 | | | | 2,000 |
| 18 | [1] 54.69 | [2] 45.31 | | | | 1,411 |
| 19 | | | 35.78 | 38.18 | [3] 26.04 | 1,424 |

[1] $Na_2B_4O_7 \cdot 4H_2O$.
[2] $NaH_2PO_4$.
[3] $LiOH \cdot H_2O$.

Table II discloses the mol percentages of $B_2O_3$, $P_2O_5$ and $K_2O$ for binder compositions 1–17 and the mol percentages of oxides in compositions 18 and 19.

TABLE II

| No. | $B_2O_3$ | $P_2O_5$ | $K_2O$ |
|---|---|---|---|
| 1 | 66.7 | | 33.3 |
| 2 | 65.6 | 12.5 | 21.9 |
| 3 | 47.4 | 27.1 | 25.5 |
| 4 | 44.7 | 25.6 | 29.7 |
| 5 | 40.6 | 23.3 | 36.1 |
| 6 | 37.8 | 21.6 | 40.6 |
| 7 | 34.2 | 19.8 | 46.0 |
| 8 | 33.3 | 33.3 | 33.3 |
| 9 | 28.6 | 28.6 | 42.8 |
| 10 | 10.5 | 42.1 | 47.4 |
| 11 | 80.0 | 10.0 | 10.0 |
| 12 | 52.6 | 30.1 | 17.3 |
| 13 | 36.7 | 36.7 | 26.6 |
| 14 | 26.4 | 15.1 | 58.5 |
| 15 | 31.6 | 18.4 | 50.0 |
| 16 | 8.9 | 35.6 | 55.5 |
| 17 | | 50.0 | 50.0 |
| 18 [1] | 37.8 | 21.6 | 40.6 |
| 19 [2] | 37.8 | 21.6 | 40.6 |

[1] $Na_2O$.
[2] $Li_2O$.

Table III discloses the flexural strength in pounds per square inch and moisture resistance in percentage of flexural strength as described above for binder compositions 1–19.

TABLE III

| No. | Flexural Strength, p.s.i. | Percent Moisture Resistance |
|---|---|---|
| 1 | 44,657 | 103.5 |
| 2 | 45,813 | 91.5 |
| 3 | 44,086 | 96.3 |
| 4 | 43,921 | 93.3 |
| 5 | 47,341 | 96.6 |
| 6 | 45,844 | 91.8 |
| 7 | 44,835 | 98.3 |
| 8 | 45,619 | 100.9 |
| 9 | 46,734 | 88.1 |
| 10 | 44,771 | 102.5 |
| 11 | 37,991 | 100.0 |
| 12 | 29,188 | 95.4 |
| 13 | 27,185 | 113.1 |
| 14 | 28,115 | 95.6 |
| 15 | 47,450 | 64.3 |
| 16 | 45,781 | 00.0 |
| 17 | 32,792 | 69.4 |
| 18 | 33,130 | 100.5 |
| 19 | 29,519 | 106.0 |

Composition No. 5 in the above tables provides a reconstituted mica sheet with an inorganic binder impregnated therein from muscovite mica which exhibited a high flexural strength of 47,341 pounds per square inch and a substantial moisture resistance of 96.6 percent of the flexural strength after a two-hour water immersion and redry. The raw materials for composition 5 comprised 19.62 parts by weight of potassium borate, 31.18 parts by weight of potassium dihydrogen phosphate, 23.84 parts by weight of boric acid, and 25.36 parts by weight of 85 percent concentrated phosphoric acid. These materials were mixed together with 1,591 parts by weight of distilled water to provide a binder composition in solution. This solution results in a binder composed of 40.6 mol percent $B_2O_3$, 23.3 mol percent $P_2O_5$ and 36.1 mol percent $K_2O$.

A wet reconstituted mica sheet was formed on a screen, dried and calendered as described above. Above binder composition No. 5 in solution was applied to the sheet to impregnate the binder composition therein. The sheet was then dried by exposure to a temperature in the range of 85° C. to 95° C. for a period of about one hour. The drying was carried out to the point where less than one percent of moisture was present in the sheet which was retained on the screen during the drying process. Such drying is necessary in order to remove the sheet from the screen without tearing.

It is necessary before pressing the sheet to remoisten it to a moisture weight content of from one percent to ten percent water and preferably four percent to facilitate pressing and to prevent blistering during the baking process. The amount of remoistening within the above range will depend on binder content, pressure, the thickness of the sheet, and the rate of heating during drying, subsequent conditioning, and the baking cycle. Permissible moisture may in some cases range as high as ten percent, but generally speaking, for mica sheet 0.012 inch thick from three to five percent of moisture prior to pressing is preferred.

The preferred pressing temperature is 200° C. but lower or higher temperatures may be employed. The preferred pressing pressure is 500 pounds per square inch, although good results have been obtained with much lower pressures. Pressures up to about 4000 pounds per square inch have been used in producing a desirable material. The time of pressing depends upon the temperature and pressure employed. Generally speaking, such times can be determined for any particular size sheet by routine experimentation. For example, at 500 pounds per square inch and 200° C. using reconstituted mica sheet 0.012 inch thick, such that the maximum distance from any point to the edge of the sheet is six inches; the pressing time is about two hours.

After pressing the sheet, it may be preconditioned to remove any blister-producing residual traces of water by exposing the sheet to a gradual rise in temperature from about 90° C. to 175° C. over a period of from about 8 to 24 hours. To the extent that the preconditioning process may be combined with the succeeding baking process, this step may be omitted.

At the time the sheet is preconditioned and ready for baking, it is still susceptible to disintegration in water, but by further raising the temperature in the baking step in an open oven to a critical value, an unexpected conversion to an insoluble reconstituted mica sheet takes place. For the present oxide binder combinations, this occurs at a temperature of about 560° C. For example, a sheet 0.012 inch thick requires about two hours to come up to temperature. After reaching the baking temperature, the sheet is held at that constant temperature for about one hour. It will be realized that the baking cycle is of a time-temperature nature. The sheet produced by the process, once the mica particles and binder have been unified into a mica particle-binder system, can for example, be immersed two hours in water, redried gently and it will exhibit substantially all of its original flexural strength.

We found that binder compositions of $B_2O_3$, $K_2O$ and $P_2O_5$ in relative mol percentages which were not within the area defined by solid lines AB, BC, CD, DE, EF, FG, GH and HA or were not defined by line HA in the ternary diagram in the single figure of the drawing did not exhibit both the improved flexural strength and substantial moisture resistance required and obtainable by the practice of the present invention. As set forth above in Tables I, II, and III, compositions 11, 12, 13 and 14 when impregnated into separate pieces of reconstituted mica sheet did not exhibit improved flexural strength above 40,000 pounds per square inch. Compositions 15 and 16 under similar conditions failed to exhibit substantial moisture resistance. Composition 17, when it was impregnated into such mica sheet, failed to exhibit either of these properties.

Compositions 18 and 19 were also impregnated into separate pieces of reconstituted mica sheet. The sheet impregnated with composition 18 exhibited a flexural strength of 33,130 pounds per square inch. The sheet impregnated with composition 19 exhibited a flexural strength of 29,519 pounds per square inch. Both of these mica sheets were substantially moisture resistant. Compositions 18 and 19 were impregnated into separate mica sheets and tested for flexural strength and moisture resistance to determine if equivalent substitution of $Na_2O$ or $Li_2O$ for $K_2O$ would produce the improved properties of the present invention. Compositions 18, 19 and 6 contained identical mol percentages of $B_2O_3$ and $P_2O_5$. The compositions were varied by 40.6 mol per cent of $Na_2O$, $Li_2O$, and $K_2O$ respectively. Both of the sheets impregnated with compositions 18 and 19, respectively, failed to produce the improved flexural strength of the sheet impregnated with composition 6.

Several examples of producing improved inorganic-bonded reconstituted mica sheet in accordance with the present invention were as follows. The binder composition in each of the following Examples 1–10 corresponds to binder compositions 1–10 set forth in Tables I, II, and III. In each of the following examples, a slurry of finely divided mica particles in water was employed. The slurry was formed by firing muscovite mica. This mica was added to deionized water and the resulting slurry was violently agitated to comminute the mica particles. The ultra-fine particles and the coarse particles were then separated from the slurry and the resulting material was formed on a screen into a wet reconstituted mica sheet. The sheet was dried and calendered.

Example I

An inorganic binder composition was prepared from 100 parts by weight of $K_2B_4O_7 \cdot 4H_2O$. This material was mixed together with 1900 parts by weight of distilled water. The resulting binder solution composition comprised in amount, in terms of the respective oxides, of 66.7 mol percent $B_2O_3$ and 33.3 mol percent $K_2O$. Four of the above dried reconstituted mica sheets having dimensions of 8 inch x 10 inch x 0.004 inch had the above binder composition applied thereto by painting thereon to impregnate the binder composition therein. The impregnated sheets were then dried at a temperature of 90° C. for a period of 18 hours to retain less than one percent moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. at a rate not exceeding a 5° increase every two hours. The heating was then continued by raising the temperature not more than 50° every thirty minutes until 560° C. was reached. The sheet was then baked at a temperature of about 560° C. for a period of one hour to provide an insoluble reconstituted mica sheet. The binder constituted about 5.9 weight percent of the sheet.

This sheet was allowed to cool before its flexural strength was measured at 45,657 pounds per square inch. The sheet was immersed subsequently in water for two hours, redried and measured again for flexural strength. The sheet exhibited 103.5 percent of its original flexural strength. Thus, the reconstituted mica sheet impregnated with an inorganic binder composition of the present invention exhibited both improved flexural strength and complete moisture resistance.

Example II

An inorganic binder composition was prepared from 54.44 parts by weight of $K_2B_4O_7 \cdot 4H_2O$, 22.08 parts by weight of $H_3BO_3$ and 23.48 parts by weight of $H_3PO_4$. These materials were mixed together with 1928 parts by weight of distilled water. The resulting binder solution composition comprised in amount, in terms of the respective oxides, of 65.5 mol percent $B_2O_3$, 12.5 mol percent $P_2O_5$, and 2.91 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 105° C. to 175° C. over a period of about 72 hours. The temperature was then raised gradually to 560° C. over a period of 4.5 hours. The sheet was then baked at a temperature of about 560° C. for a period of one hour to provide an insoluble reconstituted mica sheet. The binder constituted about 5.7 weight percent of the sheet.

This sheet was allowed to cool before its flexural strength was measured at 45,813 pounds per square inch. The sheet was immersed subsequently in water for two hours, redried and measured again for flexural strength. The sheet exhibited 91.5 percent of its original flexural strength. Thus, the reconstituted mica sheet impregnated with an inorganic binder composition of the present invention exhibited both improved flexural strength and substantial moisture resistance.

Example III

An inorganic binder composition was prepared from 25.06 parts by weight of $K_2B_4O_7 \cdot 4H_2O$, 25.52 parts by weight of $KH_2PO_4$, 23.90 parts by weight of $H_3BO_3$ and 25.52 parts by weight of $H_3PO_4$. These materials were mixed together with 2451 parts by weight of distilled water. The resulting binder solution composition comprised in amount, in terms of the respective oxides, of 47.4 mol percent $B_2O_3$, 27.1 mol percent $P_2O_5$, and 25.5 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 105° C. to 175° C. over a period of about 72 hours. The temperature was then raised gradually to 560° C. over a period of 4.5 hours. The sheet was then backed at a temperature of about 560° C. for a period of one hour to provide an insoluble reconstituted mica sheet. The binder constituted about 4.7 weight percent of the sheet.

This sheet was allowed to cool before its flexural strength was measured at 44,086 pounds per square inch. The sheet was immersed subsequently in water for two hours, redried and measured again for flexural strength. The sheet exhibited 96.3 percent of its original flexural strength. Thus, the reconstituted mica sheet impregnated with an inorganic binder composition of the present invention exhibited both improved flexural strength and substantial moisture resistance.

*Example IV*

An inorganic binder composition was prepared from 15.40 parts by weight of $K_2B_4O_7 \cdot 4H_2O$, 24.49 parts by weight of $KH_2PO_4$, 29.13 parts by weight of $H_3BO_3$ and 30.98 parts by weight of $H_3PO_4$. These materials were mixed together with 1671 parts by weight of distilled water. The resulting binder solution composition comprised in amount, in terms of the respective oxides, of 44.7 mol percent $B_2O_3$, 25.6 mol percent $P_2O_5$, and 29.7 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. over a period of about 90 hours, after which it was gradually increased to 560° C. over a period of 4.5 hours. The sheet was then baked at a temperature about 560° C. for a period of about one hour, to provide an insoluble reconstituted mica sheet. The binder constituted about 5.2 weight percent of the sheet.

This sheet was allowed to cool before its flexural strength was measured at 43,921 pounds per square inch. The sheet was immersed subsequently in water for two hours, redried and measured again for flexural strength. The sheet exhibited 93.3 percent of its original flexural strength. Thus, the reconstituted mica sheet impregnated with an inorganic binder composition of the present invention exhibited both improved flexural strength and substantial moisture resistance.

*Example V*

An inorganic binder composition was prepared from 19.62 parts by weight of $K_2B_4O_7 \cdot 4H_2O$, 31.18 parts by weight of $KH_2PO_4$, 23.84 parts by weight of $H_3BO_3$, and 25.36 parts by weight of $H_3PO_4$. These materials were mixed together with 1591 parts by weight of distilled water. The resulting binder solution composition comprised in amount, in terms of the respective oxides, of 40.6 mol percent $B_2O_3$, 23.3 mol percent $P_2O_5$, and 36.1 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. over a period of about 90 hours. After further raising the temperature gradually to 560° C. over a period of 4.5 hours, the sheet was then baked at a temperature of about 560° C. for a period of one hour to provide an insoluble reconstituted mica sheet. The binder constituted about 6.2 weight percent of the sheet.

This sheet was allowed to cool before its flexural strength was measured at 47,341 pounds per square inch. The sheet was immersed subsequently in water for two hours, redried and measured again for flexural strength. The sheet exhibited 96.6 percent of its original flexural strength. Thus, the reconstituted mica sheet impregnated with an inorganic binder composition of the present invention exhibited both improved flexural strength and substantial moisture resistance.

*Example VI*

An inorganic binder composition was prepared from 49.49 parts by weight of $K_2B_4O_7 \cdot 4H_2O$, and 50.51 parts by weight of $KH_2PO_4$. These materials were mixed together with 2464 parts by weight of distilled water. The resulting binder solution composition comprised in amount, in terms of the respective oxides, of 37.8 mol percent $B_2O_3$, 21.6 mol percent $P_2O_5$, and 40.6 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. over a period of about 90 hours, after which it was gradually increased to 560° C. in a period of 4.5 hours. The sheet was then baked at a temperature of 560° C. for a period of 1.5 hours to provide an insoluble reconstituted mica sheet. The binder constituted about 6.1 weight percent of the sheet.

This sheet was allowed to cool before its flexural strength was measured at 45,844 pounds per square inch. The sheet was immersed subsequently in water for two hours, redried and measured again for flexural strength. The sheet exhibited 91.8 percent of its original flexural strength. Thus, the reconstituted mica sheet impregnated with an inorganic binder composition of the present invention exhibited both improved flexural strength and substantial moisture resistance.

*Example VII*

An inorganic binder composition was prepared from 26.99 parts by weight of $K_2B_4O_7 \cdot 4H_2O$, 42.91 parts by weight of $KH_2PO_4$, 14.59 parts by weight of $H_3BO_3$, and 15.51 parts by weight of $H_3PO_4$. These materials were mixed together with 1451 parts by weight of distilled water. The resulting binder solution composition comprised in amount, in terms of the respective oxides, of 34.2 mol percent $B_2O_3$, 19.8 mol percent $P_2O_5$, and 46.0 mol percent $K_2O$. Four of the above dried reconstituted mica sheets having dimensions of 8 inch x 10 inch by 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. over a period of about 90 hours. After raising gradually to 560° C. over a period of 4.5 hours, the sheet was then held at a temperature of 560° C. for a period of one hour to provide an insoluble reconstituted mica sheet. The binder constituted about 7.3 weight percent of the sheet.

This sheet was allowed to cool before its flexural strength was measured at 44,835 pounds per square inch. The sheet was immersed subsequently in water for two hours, redried and measured again for flexural strength. The sheet exhibited 98.3 percent of its original flexural strength. Thus, the reconstituted mica sheet impregnated with an inorganic binder composition of the present invention exhibited both improved flexural strength and substantial moisture resistance.

*Example VIII*

An inorganic binder composition was prepared from 25.8 parts by weight of $K_2B_4O_7 \cdot 4H_2O$, 45.20 parts by weight of $KH_2PO_4$, 10.27 parts by weight of $H_3BO_3$, and 19.15 parts by weight of $H_3PO_4$. These materials were mixed together with 2017 parts by weight of distilled water. The resulting binder solution composition comprised in amount, in terms of the respective oxides, of 33.3 mol percent $B_2O_3$, 33.3 mol percent $P_2O_5$, and 33.3 mol percent $K_2O$. Four of the above dried reconstituted mica sheets having dimensions of 8 inch x 10 inch x 0.004 inch had the above binder composition applied thereto to impregnate the binder composition therein. The impregnated sheet was then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 105° C. to 175° C. over a period of about 90 hours, followed by an additional rise to 560° C. over a period of 4.5 hours. The sheet was then baked at a temperature of 560° C. for a period of one hour to provide an insoluble reconstituted mica sheet. The binder constituted about 5.5 weight percent of the sheet.

This sheet was allowed to cool before its flexural strength was measured at 45,619 pounds per square inch. The sheet was immersed subsequently in water for two hours, redried and measured again for flexural strength. The sheet exhibited 100.9 percent of its original flexural strength. Thus, the reconstituted mica sheet impregnated with an inorganic binder composition of the present invention exhibited both improved flexural strength and complete moisture resistance.

*Example IX*

An inorganic binder composition was prepared from 35.96 parts by weight of $K_2B_4O_7 \cdot 4H_2O$ and 64.04 parts by weight of $KH_2PO_4$. These materials were mixed together with 2000 parts by weight of distilled water. The resulting binder solution composition comprised in amount, in terms of the respective oxides, of 28.6 mol percent of $B_2O_3$, 28.6 mol percent $P_2O_5$, and 42.8 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain about one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 110° C. to 175° C. at a rate not exceeding 5° increase every two hours. The heating was then continued by raising the temperature not more than 50° every 30 minutes until 560° C. was reached. The sheet was then baked at a temperature of 560° C. for a period of one hour to provide an insoluble reconstituted mica sheet. The binder constituted about 6.2 weight percent of the sheet.

This sheet was allowed to cool before its flexural strength was measured at 46,734 pounds per square inch. The sheet was immersed subsequently in water for two hours, redried and measured again for flexural strength. The sheet exhibited 88.1 percent of its original flexural strength. Thus, the reconstituted mica sheet impregnated with an inorganic binder composition of the present invention exhibited both improved flexural strength and substantial moisture resistance.

*Example X*

An inorganic binder composition was prepared from 12.29 parts by weight of $K_2B_4O_7 \cdot 4H_2O$, and 87.71 parts by weight of $KH_2PO_4$. These materials were mixed together with 2464 parts by weight of distilled water. The resulting binder solution composition comprised in amount, in terms of the respective oxides, of 10.5 mol percent $B_2O_3$, 42.1 mol percent $P_2O_5$, and 47.4 mol percent $K_2O$. Four of the above dried reconstituted mica sheets having dimensions of 8 inch x 10 inch x 0.004 inch had the above binder composition applied thereto to impregnate the binder composition therein. The impregnated sheets were then dried at a temperature of 90° C. for a period of 18 hours, to retain less than one percent of moisture therein.

The sheets were remoistened with about four percent moisture and pressed at a temperature of 200° C. at a pressure of 500 pounds per square inch for a period of 2.5 hours. After pressing, an 0.012 inch sheet was preconditioned by exposure to a gradual rise in temperature from 105° C. to 175° C. over a period of about 90 hours, followed by an additional gradual rise to 560° C. over a period of 4.5 hours. The sheet was then baked at a temperature of 560° C. for a period of one hour to provide an insoluble reconstituted mica sheet. The binder constituted about 5.3 weight percent of the sheet.

This sheet was allowed to cool before its flexural strength was measured at 44,771 pounds per square inch. The sheet was immersed subsequently in water for two hours, redried and measured again for flexural strength. The sheet exhibited 102.5 percent of its original flexural strength. Thus, the reconstituted mica sheet impregnated with an inorganic binder composition of the present invention exhibited both improved flexural strength and complete moisture resistance.

The electrical characteristics of the inorganic-bonded reconstituted mica sheet of the present invention are very desirable. For example, sheets of reconstituted mica sheet, which were impregnated with the inorganic binder of composition 6 and described further in Example VI, disclosed the following electrical characteristics. These characteristics, which are set forth in Tables IV, V, VI, VII, VIII and IX, were produced from reconstituted mica sheet having average dimensions of 8 inch x 10 inch x 0.012 inch.

TABLE IV
[Power Factor (Percent) vs. Frequency, 23° C. Before Test]

| Sheet No. | 60 c.p.s. | 1 kc. | 10 kc. | 100 kc. | 1 mc. |
| --- | --- | --- | --- | --- | --- |
| 1 | 48.4 | 20.4 | 22.6 | 19.7 | 7.0 |
| 2 | 46.6 | 19.6 | 21.9 | 19.1 | 6.9 |
| 3 | 62.4 | 28.2 | 24.1 | 22.9 | 10.6 |

TABLE V
[Dielectric Constant vs. Frequency]

| Sheet No. | 60 c.p.s. | 1 kc. | 10 kc. | 100 kc. | 1 mc. |
| --- | --- | --- | --- | --- | --- |
| 1 | 12.9 | 9.3 | 7.1 | 4.8 | 4.1 |
| 2 | 12.5 | 9.1 | 6.9 | 4.7 | 4.1 |
| 3 | 16.6 | 10.6 | 7.8 | 5.1 | 4.1 |

TABLE VI
[Power Factor (Percent) vs. Temperature (° C.), 60 c.p.s.]

| Sheet No. | 200° C. | 350° C. | 500° C.* | 23° C. after 500° C. |
| --- | --- | --- | --- | --- |
| 1 | 14.9 | 72.7 | ---------- | 11.4 |
| 2 | 17.1 | 71.1 | ---------- | 14.4 |
| 3 | 21.8 | 75.2 | ---------- | 25.7 |

TABLE VII
[Dielectric Constant vs. Temperature (° C.), 60 c.p.s.]

| Sheet No. | 200° C. | 350° C. | 500° C.* | 23° C. after 500° C. |
| --- | --- | --- | --- | --- |
| 1 | 5.1 | 14.6 | ---------- | 4.8 |
| 2 | 5.3 | 13.8 | ---------- | 5.0 |
| 3 | 5.7 | 15.4 | ---------- | 5.6 |

In above Tables VI and VII, the asterisk (*) denotes that the measurements at 500° C. were not made since the values were too high to measure. However, sheets 1, 2 and 3 were each raised to a temperature of 500° C. prior to the measurement at 23° C.

TABLE VIII
[Volume Resistivity (ohm-cm) vs. Temperature (° C.)]

| Sheet No. | 23° C. | 200° C. | 350° C. | 500° C. | 23° C. after 500° C. |
| --- | --- | --- | --- | --- | --- |
| 1 | $2.0 \times 10^{10}$ | $8.0 \times 10^{11}$ | $3.6 \times 10^{9}$ | $6.6 \times 10^{4}$ | $1.2 \times 10^{11}$ |
| 2 | $2.4 \times 10^{10}$ | $7.8 \times 10^{11}$ | $3.9 \times 10^{9}$ | $5.9 \times 10^{4}$ | $1.7 \times 10^{11}$ |
| 3 | $9.6 \times 10^{9}$ | $4.5 \times 10^{11}$ | $3.0 \times 10^{9}$ | $4.4 \times 10^{4}$ | $1.1 \times 10^{11}$ |

TABLE IX
[Insulation Resistance (ohms) vs. Temperature (° C.)]

| Sheet No. | 23° C. | 500° C. | 300° C. | 100° C. | 23° C. after 500° C. |
| --- | --- | --- | --- | --- | --- |
| 1 | $8.2 \times 10^{7}$ | $2.8 \times 10^{7}$ | $2.2 \times 10^{9}$ | $1.2 \times 10^{12}$ | $8.3 \times 10^{8}$ |
| 2 | $8.6 \times 10^{7}$ | $3.8 \times 10^{7}$ | $2.1 \times 10^{9}$ | $9.6 \times 10^{11}$ | $1.7 \times 10^{9}$ |
| 3 | $6.0 \times 10^{7}$ | $3.1 \times 10^{7}$ | $2.6 \times 10^{9}$ | $1.0 \times 10^{12}$ | $9.6 \times 10^{8}$ |

A sheet of mica which was prepared in accordance with above Example VI was subjected to two short-time dielectric strength tests. Both of these tests employed a two-inch electrode and 500 volts per second rate of rise. The tests produced 17,000 volts for an 0.0124 inch thickness and 17,200 volts for an 0.0125 inch thickness, respectively.

While other modifications of this invention and variations thereof which may be employed within the scope of the invention have not been described, the invention is intended to include such that may be embraced within the following claims.

What we claim as new and desire to secure by Letters Patent of the United States is:

1. Inorganic-bonded reconstituted mica sheet having substantial moisture resistance, comprising a reconstituted mica sheet of comminuted natural mica particles and a cured inorganic oxide binder, said mica sheet being impregnated by said cured binder with said mica particles and binder constituting a system substantially indispersible in water, said binder consisting of relative mol percentages of $B_2O_3$, $K_2O$ and $P_2O_5$ lying within the area defined approximately in the accompanying ternary diagram of the single figure of the drawing by the solid lines AB, BC, CD, DE, EF, FG, GH and HA.

2. Inorganic-bonded reconstituted mica sheet comprising a reconstituted mica sheet of comminuted mica particles and a cured inorganic oxide binder, said mica sheet being impregnated by said cured binder with said mica particles and binder constituting a system substantially indispersible in water, said binder consisting of relative mol percentages of $B_2O_3$ and $K_2O$ defined by the solid line HA in the accompanying ternary diagram of the single figure of the drawing.

3. A method of preparing an inorganic-bonded reconstituted mica sheet which comprises providing a reconstituted mica sheet of comminuted mica particles, impregnating said sheet with a binder of oxides consisting of relative mol percentages $B_2O_3$, $K_2O$ and $P_2O_5$ lying within the area defined approximately in the accompanying ternary diagram of the single figure of the drawing by the solid lines AB, BC, CD, DE, EF, FG, GH and HA, drying said impregnated sheet to a water content of less than one percent, remoistening said sheet to a water content of from about one percent to ten percent, hot pressing said sheet at temperatures substantially below the baking temperautre, and baking said sheet at a critical temperature of about 560° C.

4. A method of preparing an inorganic-bonded reconstituted mica sheet which comprises providing a reconstituted mica sheet of comminuted mica particles, impregnating said sheet with a binder of oxides consisting of relative mol percentages of $B_2O_3$ and $K_2O$ defined by the solid line HA in the accompanying ternary diagram of the single figure of the drawing, drying said impregnated sheet to a water content of less than one percent, remoistening said sheet to a water content of from one percent to ten percent, hot pressing said sheet at temperatures substantially below the baking temperature, and baking said sheet at a critical temperature of about 560° C.

5. A method of preparing an inorganic-bonded reconstituted mica sheet which comprises providing comminuted mica particles, impregnating said mica particles with a binder of oxides consisting of relative mol percentages of $B_2O_3$, $K_2O$ and $P_2O_5$ lying within the area defined approximately in the accompanying ternary diagram of the single figure of the drawing by the solid lines AB, BC, CD, DE, EF, FG, GH, and HA, said amount of binder being between 2 and 12 weight percent based on the dry weight of said mica particles, forming reconstituted mica sheet from said mica particles, drying said impregnated sheet to a water content of less than one percent, remoistening said sheet to a water content of from one percent to ten percent, hot pressing said sheet at temperatures substantially below the baking temperature, and baking said sheet at a critical temperature of about 560° C.

6. A method of preparing an inorganic-bonded reconstituted mica sheet which comprises providing comminuted mica particles, impregnating said mica particles with a binder of oxides consisting of relative mol percentages of $B_2O_3$ and $K_2O$ defined by the solid line HA in the accompanying ternary diagram of the single figure of the drawing, forming reconstituted mica sheet from said mica particles, drying said impregnated sheet to a water content of less than one percent, remoistening said sheet to a water content of from one percent to ten percent, hot pressing said sheet at temperatures below the baking temperature, and baking said sheet at a crtiical temperature of about 560° C.

7. A method of preparing an inorganic-bonded reconstituted mica sheet which comprises forming a wet reconstituted mica sheet of comminuted natural mica particles, impregnating said sheet with a binder of oxides consisting of relative mol percentages of $B_2O_3$, $K_2O$ and $P_2O_5$ lying within the area defined approximately in the accompanying ternary diagram of the single figure of the drawing by the solid lines AB, BC, CD, DE, EF, FG, GH and HA, drying said impregnated sheet to a water content of less than one percent, remoistening said sheet to a water content of from one percent to ten percent, hot pressing said sheet at temperatures substantially below the baking temperature, and baking said sheet at a critical temperature of about 560° C.

8. A method of preparing an inorganic-bonded reconstituted mica sheet which comprises forming a wet reconstituted mica sheet of comminuted natural mica particles, impregnating said sheet with a binder of oxides consisting of relative mol percentages of $B_2O_3$ and $K_2O$ defined by the solid line HA in the accompanying ternary diagram of the single figure of the drawing, drying said impregnated sheet to a water content of less than one percent, remoistening said paper to a water content of from one percent to ten percent, hot pressing said sheet at temperatures below the baking temperature, and baking said sheet at a critical temperature of about 560° C.

9. An inorganic-bonded reconstituted mica sheet substantially as recited in claim 1 wherein the mica particle-binder system exhibits increased flexural strength after being immersed in water for a period of two hours and then dried.

References Cited by the Examiner

UNITED STATES PATENTS

| | | | |
|---|---|---|---|
| 2,979,108 | 4/1961 | Thompson | 106—286 |
| 3,209,196 | 9/1965 | Ketterer et al. | 106—39 |
| 3,227,595 | 1/1966 | Ho et al. | 106—39 |

FOREIGN PATENTS

| | | |
|---|---|---|
| 539,704 | 9/1941 | Great Britain. |
| 539,708 | 9/1941 | Great Britain. |

HELEN M. McCARTHY, *Primary Examiner.*